L. PARKER.
FENCE.

No. 174,973. Patented March 21, 1876.

Witnesses:
A. C. Johnston
W. C. Donn

Inventor
Leonard Parker
By J. J. Johnston
his attorney

UNITED STATES PATENT OFFICE.

LEONARD PARKER, OF WINTERSET, IOWA.

IMPROVEMENT IN FENCES.

Specification forming part of Letters Patent No. 174,973, dated March 21, 1876; application filed March 2, 1876.

*To all whom it may concern:*

Be it known that I, LEONARD PARKER, of Winterset, in the county of Madison and State of Iowa, have invented certain Improvements in Portable Fences, of which the following is a specification:

The objects of the invention are, first, to simplify the construction of the fence, so that it can be easily erected or removed; secondly, to facilitate its erection on uneven ground; and, lastly, to brace the panels to give them greater strength and security in their places. It consists in connecting the panels together by a pin or stake passed through eyelets on the adjoining ends of the panels, and driven into the ground to secure the panels together and hold them upright. It further consists of a brace placed astride of the panel, with its end secured by stakes driven into the ground.

Figure 1:
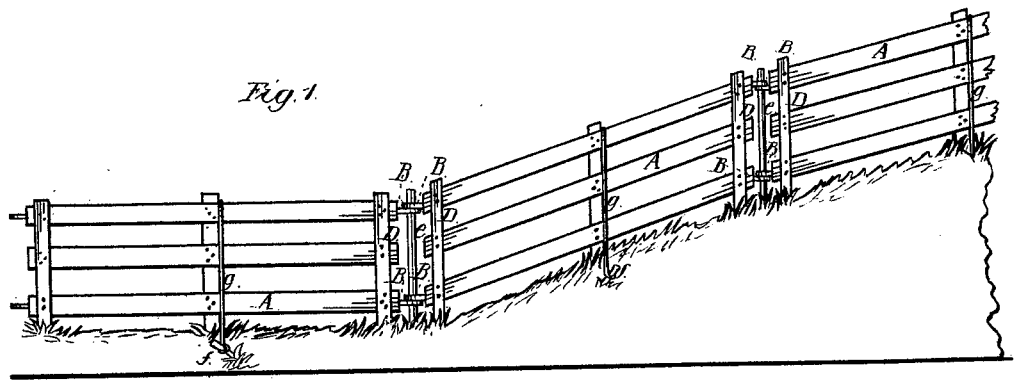
Figure 3:
Figure 4:
Figure 5:
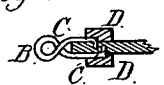
Figure 6:
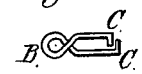
Figure 2:
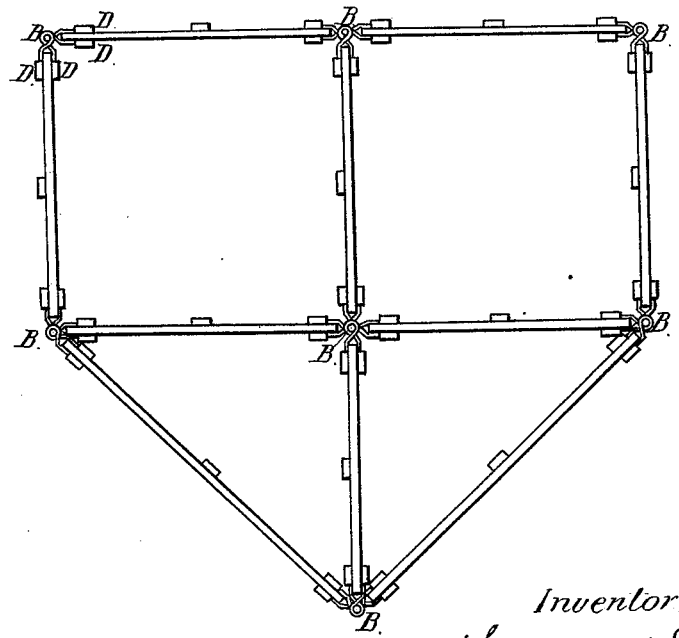

In the drawings forming part of this specification, Figure 1 represents a side elevation of the fence. Fig. 2 is a plan of the same. Fig. 3 represents a rail provided with eyelets. Fig. 4 is an end view of the panel with the brace in position, and Figs. 5 and 6 represent the eyelets.

Similar letters of reference indicate corresponding parts in all the figures.

Referring to the drawings, A represents the panels of the fence, composed of a number of rails secured together by the vertical bars D. B B are eyelets, secured to the ends of the rails by tangs C fitting in grooves in the rail, in which they are held by the bars D, which are fastened over them. Two or more of these eyelets (according to the height of the fence) are secured to the end of each panel. E is a stake or pin, which is used to join the eyelets on the adjoining ends of the panels, it being passed through them, and then driven into the ground, thereby securing the ends of the panels together, and at the same time holding them in an upright position. E is the brace, consisting of the stanchion $g$, having looped ends, through which the pins $f$ are passed, and driven into the ground. The brace is placed astride the panels about midway of their length.

The advantages which this fence possesses will be apparent on inspection. It is simply constructed and easily put up, and is securely held in place. The brace, bearing down on the panels, holds it upright, and secures it against the wind and the attacks of cattle. In addition, it may be erected as easily on the side of the hill as anywhere else by making one leg of the brace longer than the other, so as to reach the ground on the lower side. The brace prevents it from getting out of place. Its construction, also, is such that teams may pass through at any point, as, each panel being hinged to the next one, by removing one of the stakes, it may be turned out like a gate. It will be observed that the eyelets are arranged so that one of those on each panel serves as a bearing for one on the adjoining panel.

What I claim as of my invention is—

In a portable fence, two or more of the horizontal rails of each panel provided with eyelets B, each having two tangs, $c$, held in and to said rails through the medium of grooves and the vertical bars D, said eyelets being used in combination with the pins $e$, whereby two or more adjoining panels may be hinged and held together in any desired position, substantially as herein described, and for the purpose set forth.

LEONARD PARKER.

Witnesses:
JAMES J. JOHNSTON,
W. C. DONN.